5/15/84 XR 4,448,075

United States Patent [19]

Takemura et al.

[11] 4,448,075

[45] May 15, 1984

[54] ULTRASONIC SCANNING APPARATUS

[75] Inventors: Yasuhiko Takemura; Fumihiko Akutsu, both of Tochigi, Japan

[73] Assignee: Tokyo Shibaura Denki Kabushiki Kaisha, Kawasaki, Japan

[21] Appl. No.: 260,992

[22] Filed: May 6, 1981

[30] Foreign Application Priority Data

May 9, 1980 [JP] Japan .................................. 55-61592

[51] Int. Cl.³ .............................................. G01N 29/00

[52] U.S. Cl. .......................................... 73/626; 73/628

[58] Field of Search ................. 73/628, 626, 625, 619, 73/618

[56] References Cited

U.S. PATENT DOCUMENTS

| | | | |
|---|---|---|---|
| 4,012,952 | 3/1983 | Dory | 73/626 |
| 4,112,411 | 9/1978 | Alais et al. | 73/626 X |
| 4,131,023 | 12/1978 | Mezrich et al. | 73/626 X |
| 4,161,121 | 7/1979 | Zitelli et al. . | |
| 4,307,613 | 12/1981 | Fox | 73/626 |
| 4,324,142 | 4/1982 | Auphan et al. | 73/626 |
| 4,359,767 | 11/1982 | Sachs et al. | 73/626 X |

FOREIGN PATENT DOCUMENTS

| | | |
|---|---|---|
| 2334953 | 7/1977 | France . |
| 772083 | 4/1957 | United Kingdom . |
| 1023549 | 3/1966 | United Kingdom . |
| 1244551 | 9/1971 | United Kingdom . |
| 1553933 | 10/1979 | United Kingdom . |
| 2053475 | 2/1981 | United Kingdom . |

*Primary Examiner*—James J. Gill

*Attorney, Agent, or Firm*—Finnegan, Henderson, Farabow, Garrett & Dunner

[57] ABSTRACT

An ultrasonic scanning apparatus includes a transducer plate, a plurality of elongated, parallel driving line electrodes arranged on one surface of the transducer plate and a plurality of elongated, parallel grounding line electrodes arranged on the opposite surface of said transducer plate. The driving line electrodes and the grounding line electrodes intersect to effectively form a matrix of individual transducer elements capable of both emitting and receiving ultrasonic beams. The apparatus includes control means to sequentially activate selected arrays of the individual transducer elements to produce and focus the resultant ultrasonic beam and to sequentially switch selected arrays of the individual transducer elements to a reception mode to vary the effective reception area of the transducer.

8 Claims, 22 Drawing Figures

ULTRASONIC SCANNING APPARATUS

This invention relates to an ultrasonic probe and its driving method, and more particularly to an electronic scanning type ultrasonic probe and its driving method improved in the lengthwise and crosswise directivity.

As illustrated in FIG. 1, an electronic scanning type ultrasonic probe used with the conventional ultrasonic diagnostic apparatus comprises a transducer constructed by providing a driving electrode 12 on one side of a transducer material 10 (for example, piezoelectric element) and a grounding electrode 14 on the opposite side thereof. The driving electrode 12 is formed of a plurality of divided electrode components $16_l$ to $16_n$ spatially arranged lengthwise (in the X axis) of the piezoelectric element 10 in the form of comb teeth. The divided electrode components $16_l$ to $16_n$ are connected to the corresponding voltage-impressing leads $18_l$ to $18_n$. The grounding electrode 14 is formed of a single plate, which is connected to a grounding voltage-impressing lead 20. The respective portions of the piezoelectric element 10 which are sandwiched between the divided electrode components $16_l$ to $16_n$ and grounding electrode 14 act as individual transducer elements. FIG. 2 is an equivalent circuit of the ultrasonic probe of FIG. 1, with the same parts denoted by the same reference numerals. With the conventional ultrasonic probe constructed as described above, the focus of an ultrasonic beam and the effective aperture of the entire transducer is controlled by selectively actuating the respective divided transducer elements. With the prior art ultrasonic probe, a series of divided driving electrode components are first actuated at the same time. In the next step, a series of the same number of consecutive driving electrode components displaced from the first mentioned series by one electrode component are operated at the same time. This procedure is repeated, thereby causing the direction in which ultrasonic beam is emitted from each group of driving electrode elements to be shifted in parallel along the X axis of the piezoelectric element 10.

With the transducer of the conventional ultrasonic probe, the driving electrode 12 is divided into a plurality of electrode components arranged, as illustrated in FIG. 1, along the X axis of the piezoelectric element 10 in the form of comb teeth, enabling the emission of an ultrasonic beam along said X axis to be controlled, but failing to control the emission of the ultrasonic beam along the Y axis of the piezoelectric element 10 crosswise intersecting said X axis. Therefore, the prior art ultrasonic probe caused an ultrasonic beam to be emitted along said Y axis with an unsatisfactory directivity.

Generally, the smaller the effective aperture of the transducer, the lower the directivity of an ultrasonic beam. Therefore, a transducer in common use has a certain width not only along the X axis but also the Y axis. Where, however, the transducer is made appreciably wide along the Y axis, then echo signals brought along the Y axis are resolved at an inevitably decreased rate, rendering an ultrasonic image based on said echo signals indistinct.

A known process of improving the directivity of an ultrasonic beam along the Y axis of the piezoelectric element 10 comprises the application of an acoustic lens. However, the acoustic lens has the drawbacks that it presents difficulties in handling and results in the corresponding increase in the number of parts used with the ultrasonic probe.

Another known device intended to improve the directivity of an ultrasonic beam along both X and Y axes of the piezoelectric element comprises a transducer constructed by dividing a driving electrode into electrode components or chips arranged in said X and Y axes, that is, in the matrix form. However, division of the driving electrode into the matrix-arranged chips involves working difficulties, and undesirably results in a prominent increase in the number of leads connected to the respective chips.

It is accordingly an object of this invention to provide an ultrasonic probe of simple arrangement which enables an ultrasonic beam to be transmitted and received with an improvement in the directivity along the lengthwise and crosswise axes of a piezoelectric element.

Another object of the invention is to provide an ultrasonic probe-driving method which can control the directivity of an ultrasonic beam transmitted and received along the lengthwise and crosswise axes of a piezoelectric element constituting the ultrasonic probe.

To attain the first object, this invention provides an ultrasonic probe which comprises:

a piezoelectric element;

a plurality of divided driving electrode components arranged in parallel with each other on one side of the piezoelectric element; and a plurality of divided grounding electrode components arranged in parallel with each other on the opposite side of the piezoelectric element each other in a direction intersecting that in which said divided driving electrode components are arranged, and wherein those portions of said piezoelectric element which are positioned in the areas defined between the spatially intersecting divided driving electrode components and divided grounding electrode components act as individual piezoelectric element blocks.

To attain the second object, the invention provides a method of driving the above-mentioned ultrasonic probe which comprises the steps of:

successively supplying an electric signal in a prescribed timing to a plurality of divided driving electrode components arranged in parallel with each other on one side of the piezoelectric element;

successively supplying an electric signal to a plurality of divided grounding electrode components arranged in parallel with each other on the opposite side of said piezoelectric element in a state spatially intersecting said divided driving electrode components in a timing having a prescribed relationship with that in which an electric signal is supplied to said divided driving electrode components;

actuating the selected ones of the blocks of the piezoelectric element; which are positioned in the areas defined between the spatially intersecting divided driving electrode components and divided grounding electrode components, thereby controlling the directivity of an emitted ultrasonic beam with respect to the lengthwise and crosswise axes of the piezoelectric element;

when echo signals of an ultrasonic beam are received, switching the divided driving electrode components and divided grounding electrode components in a timing corresponding to that in which an electric signal was previously supplied to said divided driving electrode components and divided grounding electrode components, thereby changing the effective aperture of the piezoelectric element; and receiving the echo signals of an ultrasonic beam emitted through the above-mentioned steps with the directivity of said received echo signals well controlled with respect to the lengthwise and crosswise axes of the piezoelectric element.

Where an electric signal is supplied by the known focus process to the divided grounding electrode components, then the ultrasonic probe embodying this invention can assure the same effect as the conventional acoustic lens with respect to the crosswise direction of the piezoelectric element. The ultrasonic probe of the present invention which has a simple arrangement and can be easily driven is saved from the drawbacks accompanying the prior art acoustic lens, and further has the advantage of varying a focus, while the acoustic lens has its focus fixed.

With the ultrasonic probe of this invention, those portions of the piezoelectric element which are disposed in the areas defined between the spatially intersecting divided driving electrode components arranged in parallel with each other on one side of said piezoelectric element and divided grounding electrode components arranged in parallel with each other on the opposite side of said piezoelectric element act as individual transducer elements. In other words, the entire piezoelectric element may be regarded as being composed of matrix-arranged transducer chips. The respective piezoelectric element blocks can be formed by a combination of the selected one of the divided driving electrode components and the selected one of the divided grounding electrode components. Therefore, it suffices to provide an equal number of leads to that of the total of the divided driving electrode components and divided grounding electrode components. Therefore, it is unnecessary to draw a large number of leads, as in the prior art ultrasonic probe, from the divided driving electrode components and divided grounding electrode components arranged in the matrix form on the piezoelectric element, thereby prominently decreasing a required number of leads.

Further as previously described, the ultrasonic probe of this invention is formed of divided driving electrode components arranged in parallel with each other on one side of a piezoelectric element and divided grounding electrode components spatially arranged in parallel with each other on the opposite side of said piezoelectric element. Compared, therefore, with the prior art ultrasonic probe formed of matrix-arranged driving electrode chips, the ultrasonic probe of the invention can be manufactured with far less difficulties than in the past.

By way of example and to make the description clearer, reference is made to the accompanying drawings, in which.

Figure 3:
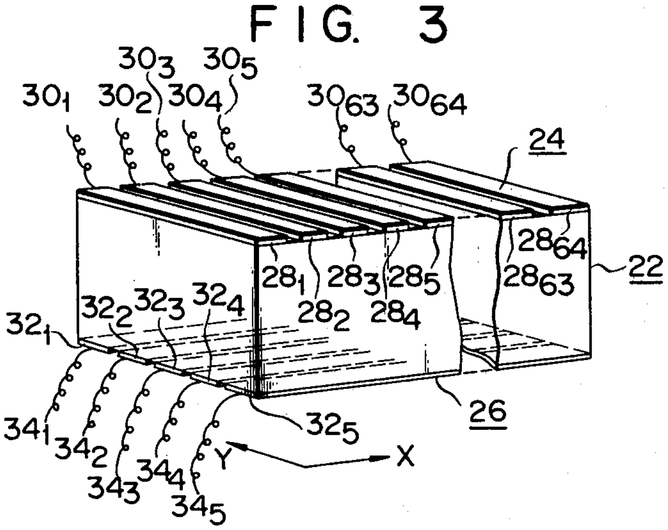
FIG. 3 is a schematic oblique view of a transducer of an ultrasonic probe embodying this invention.
Figure 8:
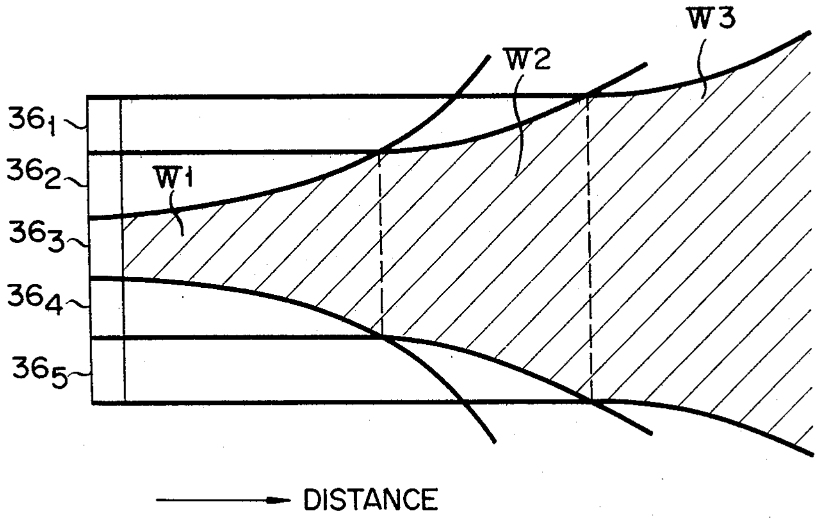
Figure 9:
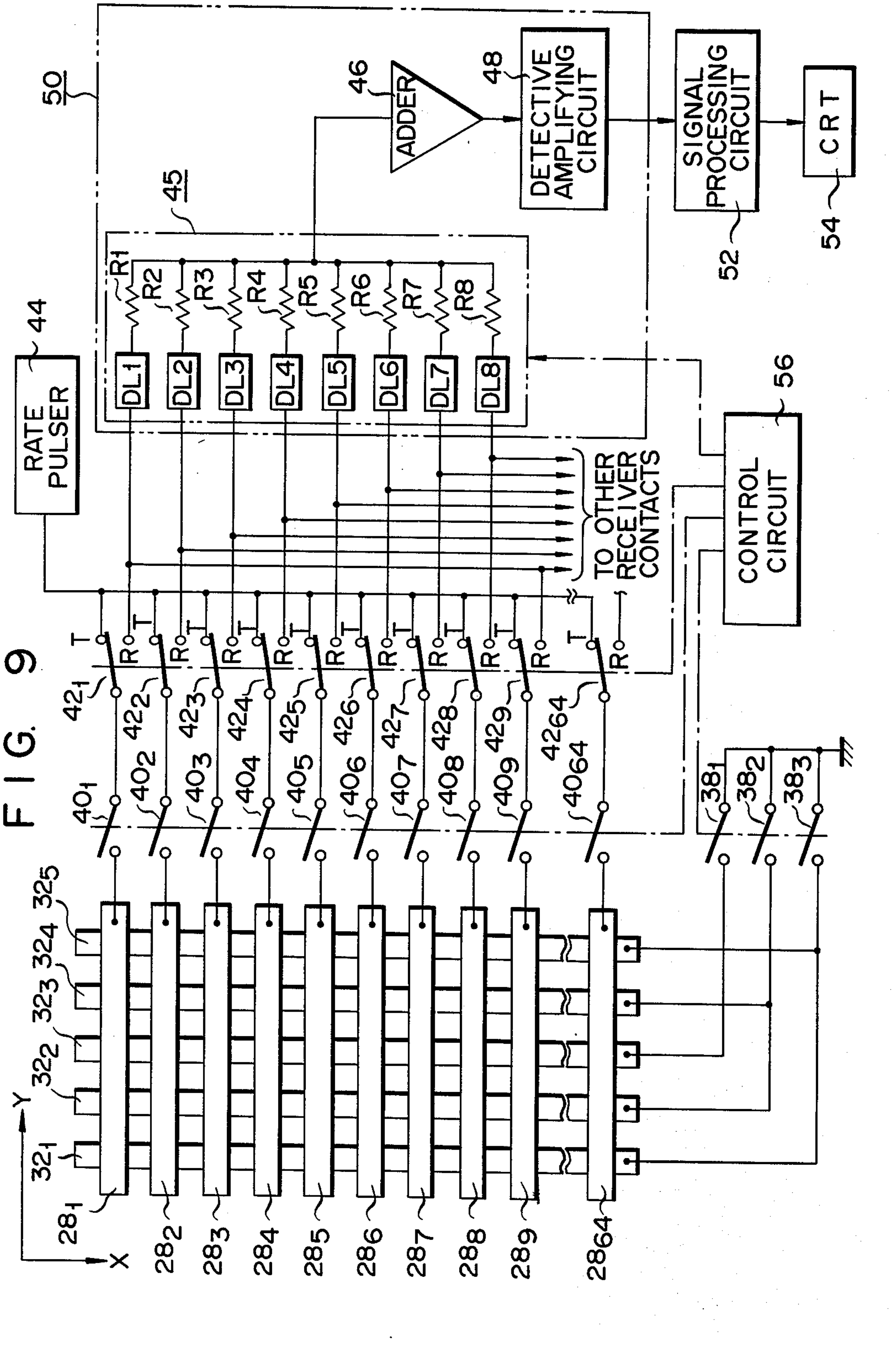
Figures 10A, 10B, 10C, 10D, 10E, 10F, 10G, 10H, 10I, 10J, 10K, 10L, 10M:
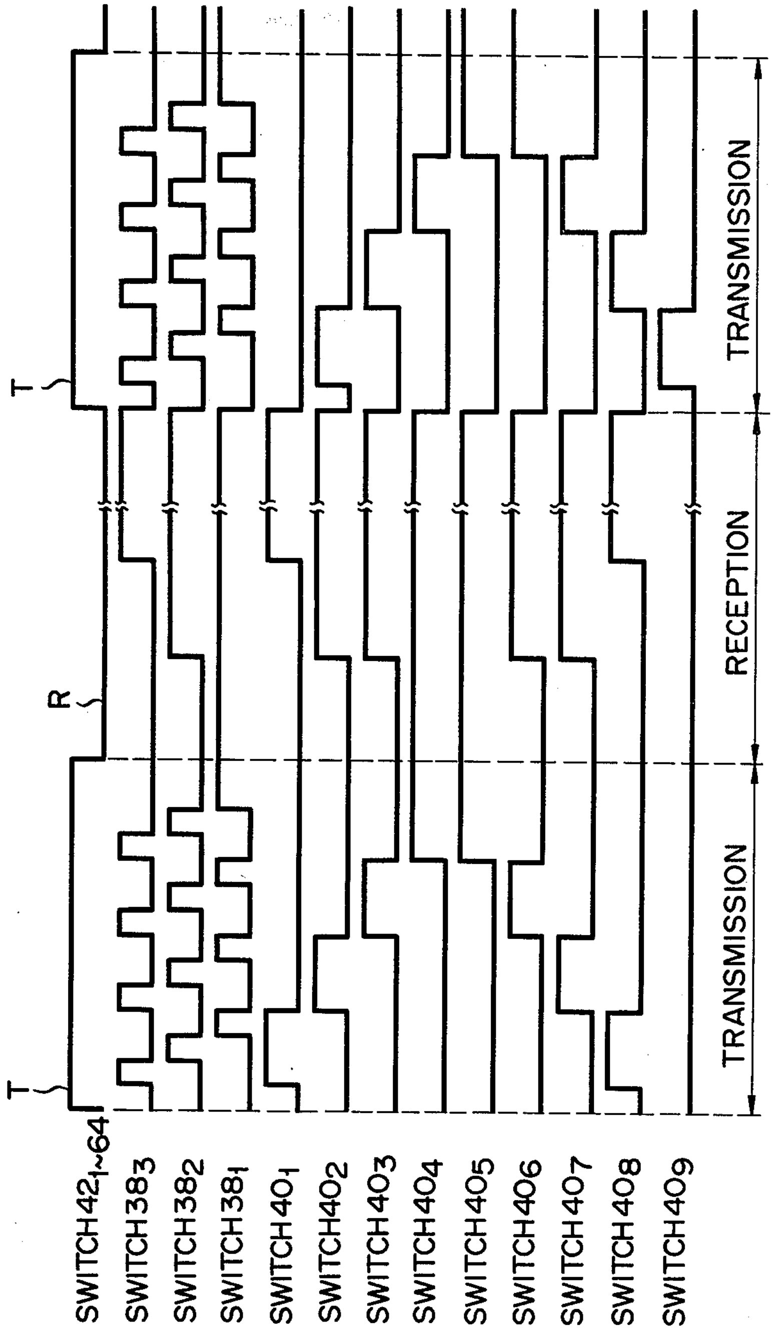

FIG. 8 indicates the manner in which the echo signals of an ultrasonic beam are received by varying the effective aperture of the transducer of FIG. 3 which extends along the Y axis thereof;

FIG. 9 is a schematic circuit arrangement of an ultrasonic diagnostic apparatus embodying this invention which is provided with the transducer of FIG. 3; and FIGS. 10A to 10M are timing charts showing the operation of the circuit of the ultrasonic diagnostic apparatus of FIG. 9.

FIG. 3 is an oblique view of a transducer of an ultrasonic probe embodying this invention. The transducer comprises a transducer material, for example, a piezoelectric element 22, a driving electrode 24 which is arranged on one side of the piezoelectric element 22, and a grounding electrode 26 which is arranged on the opposite side of the piezoelectric element 22.

The wall of the grounding electrode 26 which does not contact the piezoelectric element 22 is covered with coating material, for example, epoxy resin. The wall of the driving electrode 24 is covered with backing material, for example, ferrite rubber. The driving electrode 24 and grounding electrode 26 are formed of, for example, silver. The piezoelectric element 22 is formed of, for example, lead titanate zirconate series silicon.

A plurality of (for example, 64) divided electrode components $28_1$ to $28_{64}$ spatially arranged in parallel with each other on one side of the piezoelectric element 22 along the X axis thereof jointly constitute the driving electrode 24, and are connected to the corresponding leads $30_1$ to $30_{64}$. A plurality of (for example, 5) divided electrode components $32_1$ to $32_5$ collectively constitute the grounding electrode 26. These divided electrode components $32_1$ to $32_5$ are spatially arranged in parallel with each other on the opposite side of the piezoelectric element 22 along the Y axis of the piezoelectric element 22 rectangularly intersecting the X axis along which the driving electrode components $28_1$ to $28_{64}$ are spatially arranged. The divided grounding electrode components $32_1$ to $32_5$ are connected to the corresponding leads $34_1$ to $34_5$.

Figure 4:
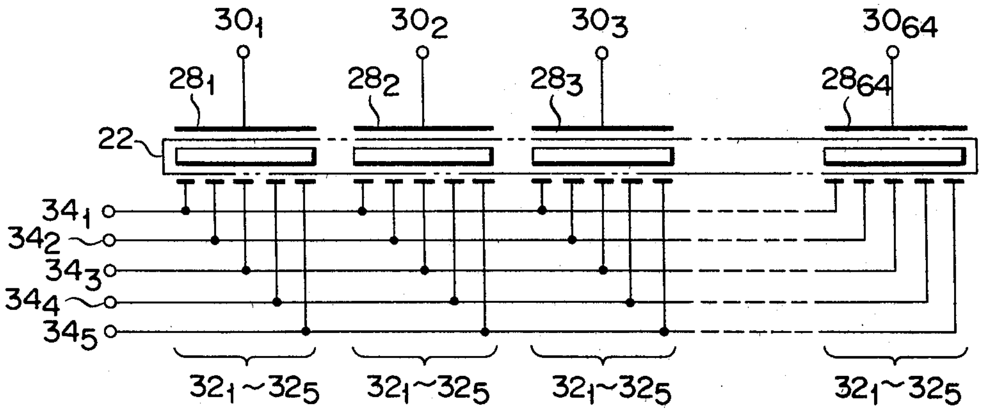
FIG. 4 is an equivalent circuit of the transducer of FIG. 3.
Figure 5:
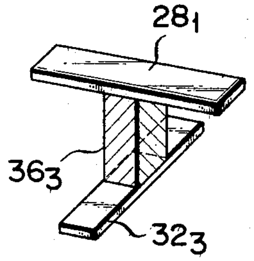
FIG. 5 is an enlarged oblique view showing the relative positions of any of the divided driving electrode components, any of the divided grounding electrode components (both electrode components spatially intersecting each other) and that portion of a piezoelectric element which is disposed in an area defined between said driving electrode component and grounding electrode component.

FIG. 4 indicates an equivalent circuit of a transducer constructed as described above. The parts of FIG. 4 the same as those of FIG. 3 are denoted by the same numerals. As seen from FIGS. 3 and 4, each of the divided grounding electrode components $32_1$ to $32_5$ spatially intersect the driving electrode components $28_1$ to $28_{64}$ at right angles, and each of those portions of the piezoelectric element 22 which are disposed in the areas defined between the spatially intersecting driving electrode components $28_1$ to $28_{64}$ and grounding electrode components $32_1$ to $32_5$ combine to jointly constitute a single transducer block. Since five divided grounding electrode components $32_1$ to $32_5$ face one divided driving electrode component (for example, $28_1$) as seen from FIG. 4, five transducer blocks are formed for said driving electrode component $28_1$. Similarly, five transducer blocks are formed for each of the other divided driving electrode components $28_2$ to $28_{64}$. As viewed from FIG. 4 showing the equivalent circuit of the transducer, the divided grounding electrode components $32_1$ to $32_5$ are connected to the corresponding leads $34_1$ to $34_5$. Where, therefore, an electric signal is supplied to any of the divided driving electrode components $28_1$ to $28_{64}$ and any of the divided grounding electrode components $34_1$ to $34_5$, then a transducer block can be selectively formed in an area defined between those of said driving and grounding electrode components which spatially intersect each other.

Where an electric signal is supplied, as shown in FIG. 5, to a divided driving electrode component $28_1$ and a divided grounding electrode componenet $32_3$ spatially intersecting each other, then that portion $36_3$ of the piezoelectric element 22 which is disposed in an area defined between said driving electrode component $28_1$ and grounding electrode component $32_3$ acts as an effective transducer block. Where, therefore, a common electric signal is supplied to the divided grounding electrode components $32_1$ to $32_5$, then the directivity of an ultrasonic beam along the X axis of the piezoelectric element 22 is controlled, as in the prior art ultrasonic probe, by supplying an electric signal to the divided driving electrode components $28_1$ to $28_{64}$ individually, or to a plurality thereof (for example $28_1$ to $28_8$) simultaneously, thereby varying the effective area or aperture of a group transducer blocks along the X axis thereof. The directivity of an ultrasonic beam along the Y axis of the piezoelectric element 22 is controlled by supplying an electric signal to the divided grounding electrode components $32_1$ to $32_5$ individually or a plurality thereof (for example, $32_1$ and $32_5$) simultaneously, thereby varying the effective area or aperture of a group of transducer blocks along the Y axis thereof. Where therefore, an electric signal is supplied to the divided driving electrode components $28_1$ to $28_{64}$ and divided grounding electrode components $32_1$ to $32_5$ at the same time, then the effective area of a group of transducer blocks can be simultaneously varied along both X and Y axes thereof, thereby enabling the directivity of an ultrasonic beam to be controlled with respect to said X and Y axes.

As seen from FIG. 3, the ultrasonic probe of this invention comprises divided driving electrode components $28_1$ to $28_{64}$ and divided grounding electrode components $32_1$ to $32_5$ spatially arranged in parallel with each other on the piezoelectric element 22. Compared, therefore, with the transducer of the conventional ultrasonic probe which is constructed by arranging fine electrode chips in the matrix form, the parts of the ultrasonic probe of the invention can be more easily manufactured and assembled.

Figure 6:
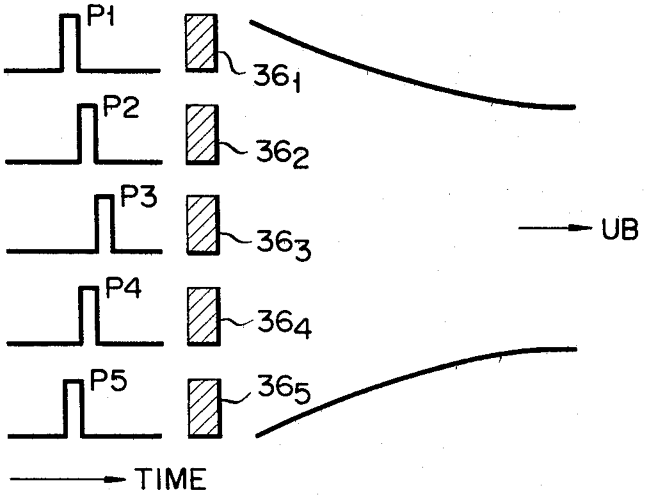
FIG. 6 illustrates the manner in which an ultrasonic beam is emitted by applying the focus process to the divided grounding electrode components arranged along the Y axis of the transducer of FIG. 3 in the form of comb teeth.

Description is now given with reference to FIG. 6 of the ultrasonic probe of FIG. 3, wherein the directivity of a transmitted ultrasonic beam is improved by applying the known focus process. This focus process converges ultrasonic beams emitted from divided transducer blocks by actuating them in sucessively delayed timing, thereby permitting the direction of the ultrasonic beams with higher accuracy. FIG. 6 illustrates transducer blocks $36_1$ to $36_5$ disposed is the areas defined between the spatially intersecting divided driving electrode component $28_1$ and divided grounding electrode components $32_1$ to $32_5$. The transducer blocks $36_1$ to $36_5$ are arranged along the Y axis of the piezoelectric element 22. Now let it be assumed that as shown in FIG. 6, a pulse $P_1$ is supplied to the transducer block $36_1$, and a pulse $P_5$ is simultaneously supplied to the transducer block $36_5$; then pulses $P_2$, $P_4$ are respectively supplied to the transducer blocks $36_2$, $36_4$ at the same time; and last a pulse $P_3$ is supplied to the transducer block $36_3$. As a result, a composite ultrasonic beam UB is produced from the converged ultrasonic beams, as shown in FIG. 6. Therefore, the directivity of said composite ultrasonic beam UB is improved with respect to the Y axis of the piezoelectric element 22.

Figure 7:
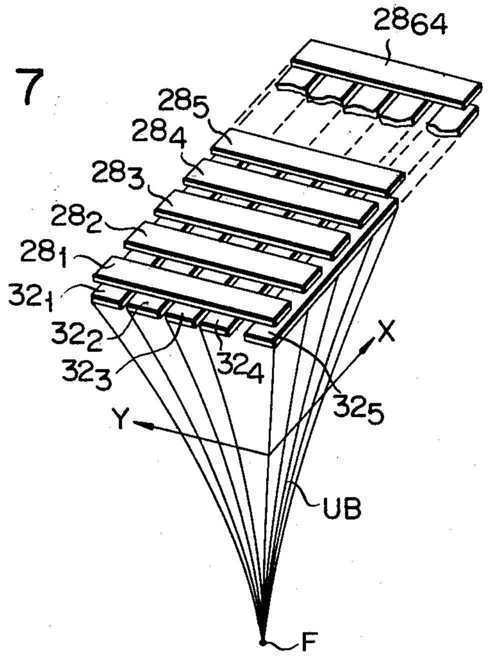
FIG. 7 illustrates the manner in which an ultrasonic beam is emitted by applying the focus process to the divided driving electrode components arranged along the X axis of the transducer of FIG. 3 and the divided grounding electrode components arranged along the Y axis of said transducer.

FIG. 7 illustrates the embodiment where the directivity of a transmitted ultrasonic beam is improved by applying the focus process to the divided driving electrode components $28_1$ to $28_{64}$ arranged in parallel with each other along the X axis of the piezoelectric element 22 and divided grounding electrode components $32_1$ to $32_5$ arranged in parallel with each other along the Y axis of said piezoelectric element 22. For briefness of presentation, FIG. 7 shows the arrangement of only some ($28_1$ to $28_5$) of the divided driving electrode components and the portions of the divided grounding electrodes $32_1$ to $32_5$, and further, the piezoelectric element 22 disposed between the rectangularly intersecting driving electrode components $28_1$ to $28_5$ and grounding electrode components $32_1$ to $32_5$ is omitted.

Now let it be assumed that, as shown in FIG. 6, a pulse $P_1$ is supplied to the divided grounding electrode component $32_1$ and a pulse $P_5$ is simultaneously supplied to the divided grounding electrode component $32_5$; at this time a pulse $Q_1$ is supplied to the divided driving electrode component $28_1$ and a pulse $Q_5$ is simultaneously supplied to the divided driving electrode component $28_5$; then a pulse $P_2$ is supplied to the divided grounding electrode component $32_2$ and a pulse $P_4$ is simultaneously supplied to the divided grounding electrode component $32_4$; at this time a pulse $Q_2$ is supplied to the divided driving electrode component $28_2$, and a pulse $Q_4$ is simultaneously supplied to the divided driving electrode component $28_4$; and last a pulse $P_3$ is supplied to the divided grounding electrode component $32_3$, and a pulse $Q_3$ is simultaneously supplied to the divided driving electrode component $28_3$. Then as illustrated in FIG. 7, ultrasonic beams UB are obtained which are focused at point F in the inverted triangular conical form, thereby assuring improvement of the directivity of an ultrasonic beam UB along the X and Y axes of the piezoelectric element 22.

This invention is not limited to the foregoing embodiment wherein the focus process is applied to an ultrasonic probe embodying this invention. For instance, the directivity of an issued ultrasonic beam along the X and Y axes of the piezoelectric element 22 can be improved by applying the linear electric-scanning process which comprises actuating the divided transducer blocks in succession thereby to scan an ultrasonic beam linearly, or the sector-scanning process which comprises actuating the divided transducer blocks in successively delayed timing thereby to scan the ultrasonic beam in the sector form having a prescribed circumferential angle.

Description is now given with reference to FIG. 8 another embodiment of this invention wherein improvement is made on the directivity of echo signals of an ultrasonic beam issued by the aforesaid focus process which are reflected from an echo target by varying the effective area of the transducer or piezoelectric element. For briefness of representation, FIG. 8 shows only five transducer blocks $36_1$ to $36_5$. As seen from FIG. 8, an ultrasonic beam emitted from the transducer block $36_3$ does not diverge widely in the near region indicated by a hatching $W_1$. Therefore, echo signals of the ultrasonic beam are received by said transducer block $36_3$ itself. Ultrasonic beams sent forth from the transducer blocks $36_2$, $36_3$, $36_4$ do not diverge sidely in the intermediate region indicated by a hatching $W_2$. Therefore, echo signals of the ultrasonic beams are received by said transducer blocks $36_2$, $36_3$, $36_4$ themselves. Last, echo signals of ultrasonic beams reflected in the remote region indicated by a hatching $W_3$ are received by all the transducer blocks $36_1$ to $36_5$. Where, as described above, echo signals of ultrasonic beams are received by varying the effective area of the piezoelectric element 22 along the Y axis thereof in accordance with a distance between the ultrasonic beam generator and echo target, then the reception directivity of the piezoelectric element 22 can be easily improved.

Description is now given with reference to FIG. 9 of the arrangement of an ultrasonic diagnostic apparatus provided with the ultrasonic probe of this invention shown in FIG. 3. The parts of FIG. 9 the same as those of FIG. 3 are denoted by the same numerals. For briefness of representation, the piezoelectric element 22 is omitted from FIG. 9.

The divided grounding electrode component $32_3$ is connected to a switch $38_1$; the divided grounding electrode components $32_2$, $32_4$ are jointly connected to a switch $38_2$; and the divided grounding electrod components $32_1$, $32_5$ are jointly connected to a switch $38_3$. Where the switches $38_1$ to $38_3$ are closed, then the corresponding divided grounding electrode components $32_1$ to $32_5$ are grounded through said switches $38_1$ to $38_3$.

The divided driving electrode component $28_1$ is connected to a switch $40_1$; the divided driving electrode component $28_2$ is connected to a switch $40_2$; the divided driving electrode component $28_3$ is connected to a switch $40_3$. All the other divided driving electrode components $28_4$ to $28_{64}$ are connected to the corresponding switches $40_4$ to $40_{64}$. The required ones of the divided driving electrode components $28_1$ to $28_{64}$ are selectively actuated by means of the prescribed ones of the switches $40_1$ to $40_{64}$. With the embodiment of FIG. 9, eight driving electrode components (for example, $40_1$ to $40_8$) are selected as a group. Where the operation of the group is brought to an end, another group of divided driving electrode components $40_2$ to $40_9$ is selectively operated which is obtained by displacing the electrode compoments $40_1$ to $40_8$ constituting the first-mentioned group by the position of one driving electrode component. Where the operation of the second group of driving electrode components is brought to an end, then a third group of divided driving electrode components ($40_3$ to $40_{10}$) is selected by displacing the electrode components $40_2$ to $40_9$ constituting the second group by the position of one driving electrode component. In the same manner as described above, the respective groups consisting of every eight ones of all the remaining divided driving electrode components are selectively operated.

The switch $40_1$ is connected to a transmission-reception switch $42_1$. The switch $40_2$ is connected to a transmission-reception switch $42_2$. The switch $40_3$ is connected to a transmission-reception switch $42_3$. All the other switches $40_4$ to $40_{64}$ are connected to the corresponding transmission-reception switches $42_4$ to $42_{64}$. The transmission-reception switches $42_1$ to $42_{64}$ are each provided with two contacts T, R. The contacts T of said transmission-reception switches $42_1$ to $42_{64}$ are jointly connected to a rate pulser 44. The contact R of the transmission-reception switch $42_1$ is connected to an input terminal of a delay line DL1. The contact R of the transmission-reception switch $42_2$ is connected to an input terminal of a delay line DL2. The contact R of the transmission-reception switch $42_8$ is connected to an input terminal of a delay line DL8. The contact R of the transmission-reception switch $42_9$ is connected to an input terminal of the delay line DL1. The contact R of the transmission-reception switch $42_{10}$ is connected to the input terminal of the delay line DL2. The contacts $R_S$ of all the transmission-reception switches $42_{11}$ to $42_{16}$ are connected to the input terminals of the delay lines DL3 to DL8. The contacts R of the respective groups consisting of every eight ones of the remaining transmission-reception switches $42_{17}$ to $42_{64}$ are respectively connected to the input terminals of the delay lines DL1 to DL8 in the same manner as described with respect to the preceding transmission-reception switches $42_1$ to $42_{16}$. At the time of transmission all the transmission-reception switches $42_1$ to $42_{64}$ are thrown toward the contact T, and, at the time of reception, toward the contact R. Where the transmission-reception switches $42_1$ to $42_{64}$ are thrown toward the contact T and any of the respective groups each consisting of, for example, every eight ones of all the switches $40_1$ to $40_{64}$ is selectively actuated, then the rate pulser 44 sends forth an electric signal to the selected divided driving electrode components. Where the transmission-reception switches $42_1$ to $42_{64}$ are thrown toward the contact R, and any of the respective groups each consisting of, for example, every eight ones of all the switches $40_1$ to $40_{64}$ is selectively actuated, then, output signals corresponding to echo signals of an ultrasonic beam received by the piezoelectric element 22 are supplied to the delay lines DL1 to DL8 through the closed switches $40_1$ to $40_{64}$ and closed transmission-reception switches $42_1$ to $42_{64}$.

The delay lines DL1 to DL8 are jointly connected to an input terminal of an adder 46 through the corresponding resistors $R_1$ to $R_8$ to reduce a difference between the points of time at which echo signals of ultrasonic beams are received by the transducer blocks disposed in the areas defined between the rectangularly intersecting divided driving electrode components $28_1$ to $28_{64}$ and divided grounding electrode components $32_1$ to $32_5$, thereby causing said echo signals to have the same phase. The delay lines DL1 to DL8 and resistors $R_1$ to $R_8$ jointly constitute a delay circuit 45.

The adder 46 is connected to a detective amplifying circuit 48. After added together by the adder 46, output signals from the delay lines DL1 to DL8 are delivered to said detective amplifying circuit 48. The detective amplifying circuit 48 detects and amplifies an output signal from the adder 48. The delay circuit 45, adder 46, and detective amplifying circuit 48 jointly constitute a signal receiver 50.

A signal-processing circuit 52 is connected to the detective amplifying circuit 48 to process signals as prescribed. CRT 54 is connected to the signal-processing circuit 52 and displays an image in accordance with an output signal from said signal-processing circuit 52.

Figure 1:
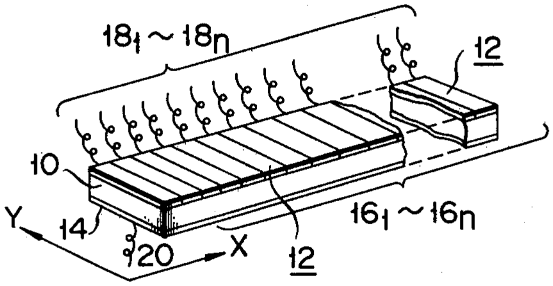
FIG. 1 (PRIOR ART)
FIG. 1 is a schematic oblique view of a transducer of an electronic scanning type ultrasonic probe used with the prior art ultrasonic diagnostic apparatus.
Figure 2:
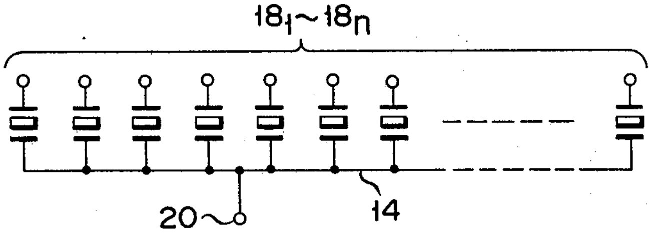
FIG. 2 (PRIOR ART)
FIG. 2 is an equivalent circuit of the transducer of FIG. 1.

A control circuit 56 is electrically connected to the switches $38_1$ to $38_3$, switches $40_1$ to $40_{64}$, transmission-reception switches $42_1$ to $42_{64}$ and delay circuit 45 to control the operation of the switches $38_1$ to $38_3$, $40_1$ to $40_{64}$ and $42_1$ to $42_{64}$, in the timings shown in FIGS. 1OA to 1OM and predetermine the extent of delay carried out by the delay circuit 45. The control circuit 56 is formed by a programable read only memory (PROM) and its control section. The timings in which the operation of the switches $38_1$ to $38_3$, $40_1$ to $40_{64}$ and $42_1$ to $42_{64}$ is to be controlled, and the extent of delay carried out by the delay circuit 45 are stored in PROM in the form of a program.

Description is now given with reference to the timing charts of FIGS. 1OA to 1OM of the operation of the above-mentioned switches.

When an ultrasonic beam is transmitted, the transmission-reception switches $42_1$ to $42_{64}$ are closed (FIG. 1OA) be being thrown toward the rate pulser 44, that is, toward the contact T. At this time, the switches $40_1$ and $40_8$ are first closed (FIGS. 1OE and 1OL). The switches $38_1$ to $38_3$ are also operated in the timings shown in FIGS. 1OB to 1OD. Later, the switches $40_2$ and $40_7$ are closed (FIGS. 1OF and 1OK). The switches $38_1$ to $38_3$ are operated in the timings shown in FIGS. 1OB to 1OD. Thereafter, the switches $40_3$ and $40_6$ are closed (FIGS. 1OG and 1OJ). The switches $38_1$ to $38_3$ are operated in the timings shown in FIGS. 1OB to 1OD. Last, the switches $40_4$ and $40_5$ are closed (FIGS. 1OH and 1OI). The switches $38_1$ to $38_3$ are operated in the timings shown in FIGS. 1OB to 1OD.

While the operation of the switches $42_1$ to $42_{64}$, $40_1$ to $40_8$ and $38_1$ to $38_3$ is controlled as described above, the rate pulser 44 sends forth an electric signal to the divided driving electrode components $28_1$ to $28_8$ and divided grounding electrode components $32_1$ to $32_5$ by the aforementioned focus process. Therefore, an ultrasonic beam is issued from the transducer blocks disposed in the areas defined between the spatially intersecting divided driving electrode components $28_1$ to $28_8$ and divided grounding electrode components $32_1$ to $32_5$ in a timing sucessively delayed from the outside to the inside of the effective aperature of the piezoelectric element 22. Therefore, the resultant composite ultrasonic beam is focused with respect to both X and Y axes of the transducer or piezoelectric element 22.

Where the transmission of an ultrasonic beam is brought to an end, the transmission-reception switches $42_1$ to $42_{64}$ are closed by being thrown toward the receiver side 50 (FIG. 1OA), that is, toward the contact R.

When echo signals of an ultrasonic beam are received, the switches $40_4$ and $40_5$ are first closed in the timings shown in FIGS. 1OH and 1OI. At this time, the switch $38_1$ is closed in a timing shown in FIG. 1OD. The switches $38_1$, $40_4$ and $40_5$ remain closed since the time of transmission in order to assure an easy transition from the transmission state to the reception state as seen from FIGS. 1OD, 1OH and 1OI. Where the operation of the switches $38_1$, $40_4$ and $40_5$ is controlled as described above, then echo signals of an issued ultrasonic beam which are reflected from the proximity of an ultrasonic beam source are received by the smaller effective aperture of the transducer or piezoelectric element 22 which is constituted by two transducer blocks disposed in the areas defined between the divided driving electrode components $28_4$, $28_5$ and a divided grounding electrode component $32_3$ which spatially intersect each other. Later, the switches $38_2$, $40_2$, $40_3$, $40_6$ and $40_7$ are closed in the timings shown in FIGS. 1OC, 1OD, and 1OF to 1OK, with the switches $38_1$, $40_4$, $40_5$ kept closed. As a result, echo signals of an ultrasonic beam which are reflected from the intermediate region between the ultrasonic beam generator and an echo target are received by a slightly larger effective aperture of the transducer or piezoelectric element 22 which is constituted by transducer blocks disposed in the areas defined between the divided grounding electrode components $32_2$ to $32_4$ and divided driving electrode components $28_2$ to $28_7$ which spatially intersect each other. Thereafter, the switches $38_3$, $40_1$ and $40_8$ are closed with the switches $38_1$, $38_2$, $40_2$ to $40_7$ kept closed in the timings shown in FIGS. 1OB to 1OL. As a result, echo signals of an ultrasonic beam which are reflected from the remotest region from the ultrasonic beam source are received by the largest effective aperture of the transducer or piezoelectric element which is constituted by transducer blocks disposed in the areas defined between the divided grounding electrode components $32_1$ to $32_5$ and divided driving electrode components $28_1$ to $28_8$ which spatially intersect each other.

As described with reference to FIG. 8, echo signals of an ultrasonic beam are received by varying the effective aperture of a transducer or piezoelectric element along the X and Y axes thereof in accordance with a distance between an ultrasonic beam source and an echo traget, thereby enabling said echo signals to be received with a high directivity with the X and Y axes of the transducer.

When the reception of the echo signals of an ultrasonic beam is brought to an end, the switch 42 is closed by being thrown toward the rate pulser 44, that is, toward the contact T in a state ready for a second transmission of an ultrasonic beam (FIG. 1OA). In this second transmission, the switches $40_2$ and $40_9$ are first closed in the timings shown in FIGS. 1OF and 10L. The switches $38_1$ to $38_3$ are operated in the timings shown in FIGS. 1OB to 1OD. Then, the switches $40_3$ and $40_8$ are closed in the timings shown in FIGS. 1OG and 10L. The switches $38_1$ to $38_3$ are also operated in the timings shown in FIGS. 1OB to 1OD. Thereafter, the switches $40_4$ and $40_7$ are closed in the timings shown in FIGS. 1OH and 1OK. The switches $38_1$ to $38_3$ are also operated in the timings shown in FIGS. 1OB to 1OD. Thereafter, the switches $40_5$ and $40_6$ are closed in the timings shown in FIGS. 1OI and 1OJ. The switches $38_1$ to $38_3$ are also operated in the timings shown in FIGS. 1OB to 1OD.

In the second transmission of an ultrasonic beam, an electric signal is supplied to a group of divided driving electrode components arranged along the X axis of the piezoelectric element 22 whose positions are displaced by one electrode component from the group of divided electrode component which was used in the first transmission of an ultrasonic beam. In the second transmission of an ultrasonic beam, the operation of switches $40_2$ to $40_9$ is controlled whose positions are displaced by one switch from the group of switches $40_1$ to $40_8$ used in the first transmission of an ultrasonic beam. In other words, the direction in which each composite ultrasonic beam is emitted is displaced along the X axis of the piezoelectric element 22 from that in which the immediately preceding composite ultrasonic beam was sent forth by that extent which is equal to a distance between every two adjacent divided driving electrode components. Thus, a composite ultrasonic beam is repeatedly transmitted and received in the aforementioned manner.

The present invention is not limited to the abovementioned embodiments. The foregoing description refers to the case where the divided grounding electrode components were made to spatially intersect the divided driving electrode components at right angles. However, both groups of electrode components may be arranged at any other angle, provided they spatially intersect each other. In the foregoing embodiments, 64 divided driving electrode components and 5 divided grounding electrode components were used. However, both types of electrode components may be increased or decreased in number. Obviously, this invention may be practised in various modifications without departing from the scope and object of the invention.

What we claim is:

1. An ultrasonic beam apparatus comprising:

a transducer plate;

a plurality of elongated, parallel driving line electrodes arranged on one surface of said transducer plate and spaced side-by-side in a first direction;

a plurality of elongated, parallel grounding line electrodes arranged on the opposite surface of said transducer plate and spaced side-by-side in a second direction not parallel to said first direction;

said driving line electrodes and said grounding line electrodes being positioned to form a matrix of individual transducer elements capable of both emitting and receiving ultrasonic beams;

a transmission control means interconnected with said driving line electrodes and said grounding line electrodes for selectively supplying electronic pulses to selected electrodes to produce ultrasonic beams; and reception control means interconnected with said driving line electrodes and said grounding line electrodes for switching selected electrodes to a reception mode to sequentially produce generally circular arrays of receptive transducer elements respectively having a common center but different diameters to thereby vary along both the first and second directions the effective reception area of the apparatus.

2. An ultrasonic beam apparatus comprising:

a transducer plate;

a plurality of elongated, parallel driving line electrodes arranged on one surface of said transducer plate and spaced side-by-side in a first direction;

a plurality of elongated, parallel grounding line electrodes arranged on the opposite surface of said transducer plate and spaced side-by-side in a second direction not parallel to said first direction;

said driving line electrodes and said grounding line electrodes being positioned to form a matrix of individual transducer elements capable of both emitting and receiving ultrasonic beams;

transmission control means interconnected with said driving line electrodes and said grounding line electrodes for supplying electronic pulses to selected electrodes to sequentially activate selected arrays of transducer elements respectively having a common center but different circumferences to thereby focus along both the first and second directions the resultant ultrasonic beam produced by the sequentially activated arrays of individual transducer element; and reception control means interconnected to said driving line electrodes and said grounding line electrodes for switching selected electrodes to a reception mode.

3. An ultrasonic beam apparatus comprising:

a transducer plate;

a plurality of elongated, parallel driving line electrodes arranged on one surface of said transducer plate and spaced side-by-side in a first direction;

a plurality of elongated, parallel grounding line electrodes arranged on the opposite surface of said transducer plate and spaced side-by-side in a second direction not parallel to said first direction;

said driving line electrodes and said grounding line electrodes being positioned to form a matrix of individual transducer elements capable of both emitting and receiving ultrasonic beams;

transmission control means interconnected with said driving line electrodes and said grounding line electrodes for supplying electronic pulses to selected electrodes to sequentially activate selected arrays of transducer elements respectively having a common center but different circumferences to thereby focus along both the first and second directions the resultant ultrasonic beam produced by the sequentially activated arrays of individual transducer elements; and reception control means interconnected with said driving line electrodes and said grounding line electrodes for switching selected electrodes to a reception mode to sequentially produce selected generally circular arrays of receptive transducer elements respectively having a common center but different diameters to thereby vary along both the first and second directions the effective reception area of the apparatus.

4. The apparatus of claim 3 wherein said transmission control means includes means for activating the transducer elements in succession to scan an ultrasonic beam linearly.

5. The apparatus of claim 3 wherein said transmission control means includes means for actuating the transducer elements in successively delayed timing thereby to scan the ultrasonic beam in a sector form.

6. The apparatus of claim 3 wherein the driving line electrodes are orthogonal to the grounding line electrodes.

7. The scanning apparatus of claim 6 wherein said transmission control means includes means for sequentially activating arrays of progressively smaller circumference to thereby focus the resultant ultrasonic beam in an inverted triangular conical form.

8. The scanning apparatus of claim 6 wherein the reception control means includes means for sequentially producing circular arrays of progressively larger diameters so that the earlier received echo signals are received by a smaller effective reception aperture and later received echo signals are received by a larger effective reception aperture.

* * * * *